United States Patent [19]

Tsuzuki et al.

[11] Patent Number: 4,482,236
[45] Date of Patent: Nov. 13, 1984

[54] ELECTRICALLY OPERATED CAMERA AND DISABLING DEVICE THEREFOR

[75] Inventors: Hiroyoshi Tsuzuki, Kanagawa; Ryuji Tokuda, Tokyo; Mutsuhide Matsuda, Kanagawa, all of Japan

[73] Assignee: Canon Kabushiki Kaisha

[21] Appl. No.: 377,942

[22] Filed: May 13, 1982

[30] Foreign Application Priority Data

May 25, 1981 [JP] Japan .................. 56-79021

[51] Int. Cl.$^3$ .................. G03B 7/00
[52] U.S. Cl. .................. 354/412; 354/268
[58] Field of Search .................. 354/268, 412

[56] References Cited

U.S. PATENT DOCUMENTS

| | | | |
|---|---|---|---|
| 4,174,893 | 11/1979 | Burgarella et al. | 354/29 |
| 4,214,827 | 7/1980 | Tominaga et al. | 354/268 X |
| 4,235,538 | 11/1980 | Uchidoi et al. | 354/268 X |
| 4,269,489 | 5/1981 | Takimoto | 354/268 X |
| 4,269,494 | 5/1981 | Shiozawa et al. | 354/268 X |
| 4,304,475 | 12/1981 | Kitai et al. | 354/268 X |
| 4,310,230 | 1/1981 | Motoori et al. | 354/268 X |
| 4,332,451 | 6/1982 | Ichii | 354/268 V |
| 4,370,043 | 1/1983 | Harigaya et al. | 354/268 X |

*Primary Examiner*—Michael L. Gellner
*Attorney, Agent, or Firm*—Toren, McGeady and Stanger

[57] ABSTRACT

The disclosed camera sequentially controls the operations of two or more units, for example, an exposure control circuit and a film advance motor. An arrangement senses whether or not an operation has been completed normally and stores the result. When the succeeding operation is to start, the condition of the storage is sensed. If the memory indicates that the operation has not been normal, then the following operation is disabled.

11 Claims, 4 Drawing Figures

FIG.2

ELECTRICALLY OPERATED CAMERA AND DISABLING DEVICE THEREFOR

BACKGROUND OF THE INVENTION

1. Field of the Invention

The present invention relates to an electrically operated camera, particularly one having a disabling device for disabling the picture taking operation when the voltage of the power source that control the shutter is lower than a predetermined value.

2. Description of the Prior Art

U.S. Pat. No. 3,856,393 discloses a camera having the so-called electric shutter which responds to the camera's power source voltage being lower than a predetermined value by preventing an exposure control magnet from operating so as to block depression of the shutter button and disable the photographic action. This disabling action is used because, in this kind of camera, there is concern that the exposure control cannot be carried out with certainty when the camera's power source has a voltage lower than a predetermined value.

However, the aforementioned conventional disabling device operates so that when the power source voltage is lower than the predetermined value, the shutter button is stopped in its path by a member operatively engaged with the depression of the shutter button so as to prevent the start of the photographic process. However, if the shutter button is depressed too quickly, the shutter button cannot be caught and, in such a case, the photographic action could be started anyway. Also, such a construction requires that the release stroke of the shutter button be long. This is inconvenient in that may result in a heavy shutter button which hinders improvement in the operability of the camera.

Proposals have been made for a camera using a sequence control circuit which detects the power source voltage and disables the transfer to a subsequent photographic sequence. Such sequence control circuits have a complicated structure and result in high production costs. Furthermore, the sequence control circuit must be supplied with power while the power source is driving other photographic operating devices. This is very likely to lower the power supply voltage when power is supplied to a drive motor in an auto focusing sequence or in a film winding sequence and thereby may cause erroneous operation of the sequence control circuit. For this reason it has been common practice to provide a special compensating circuit or a low-priced penlite battery etc. and to increase the voltage by a booster circuit.

SUMMARY OF THE INVENTION

It is accordingly an object of the present invention to provide an improved electrically operated camera which overcomes the disadvantages of prior art devices.

It is another object of the invention to provide a camera having a simple photographic operation disabling device which can disable the photographic operation of a camera without fail when the power source voltage is low.

It is a further object of the invention to provide an electrically operated camera which judges whether the conditions that enable a normal photographic operation in the next sequence are satisfied or not when a sequence control during the photographic operation is shifted to the next sequence control, so as to control the current supply to the circuit carrying out the next sequence control.

It is a further object of the invention to provide an electrically operated camera, wherein the drive device for cocking the camera is constructed not to be driven when the power source voltage is low so as to disable the photographic operation.

It is a further object of the invention to provide an electrically operated camera wherein, switching means for switching the power supply to the exposure control circuit and the wind-up control circuit are provided and at the time of the power supply to the wind-up control circuit by the switching means the power supply to the motor is controlled on the basis of the result of judgment of the power source voltage at the time of the power supply to the exposure control circuit.

These and further objects and features of the invention will become apparent from the following detailed description of an embodiment thereof taken in connection with the accompanying drawings.

DESCRIPTION OF THE PREFERRED EMBODIMENTS

Below the present invention will be explained in detail in accordance with the drawings of the embodiments.

Figure 1:
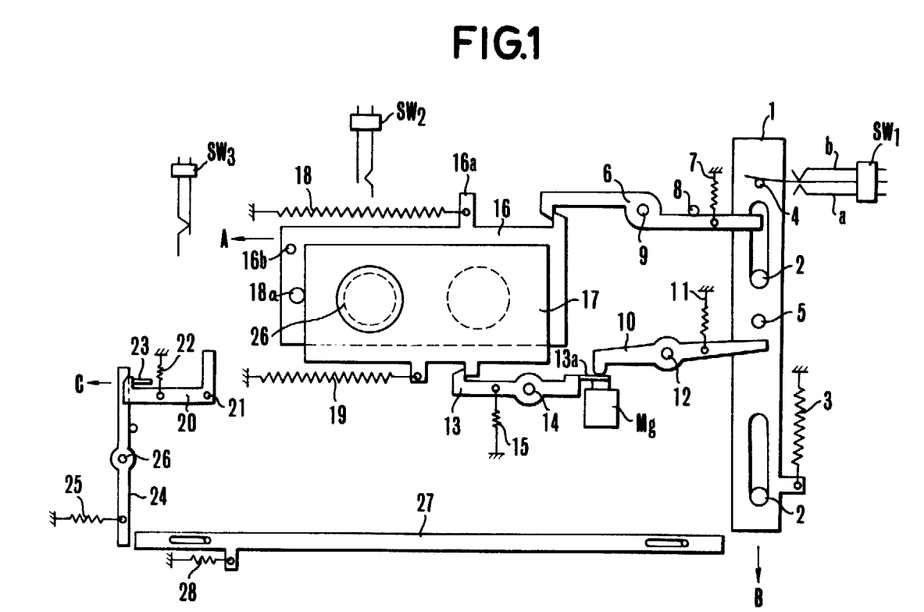
FIG. 1 shows the construction of the camera of the present invention in a plan view.

FIG. 1 shows an embodiment of the camera of the present invention. In the drawing, a release plate 1 is operated along the direction of the arrow B in the drawing by a shutter button, (not shown) and is movably supported by a pin 2 and urged upwardly by the spring 3. The release plate 1 is provided with a dowel 4 that switches the switch SW1 when the release plate 1 is operated in the direction of the arrow B, and a dowel 5 which drives the push lever 10 clockwise. The dowel 4 also drives a leading curtain holding lever 6 clockwise. The leading curtain holding lever 6 is rotatably supported on the axis 9 and urged counterclockwise by the spring 7. However, in the state shown in FIG. 1 the rotation of the lever 6 is restricted by a stopper pin 8. A leading shutter curtain 16 engages the leading curtain holding lever 6 which restricts its running, and when released is moved in the direction of the arrow A by the spring 18. A projection 16a serves to once close the switch SW2 while the leading shutter curtain is running in response to the spring 18. A dowel 16b on the leading shutter curtain 16 opens a switch SW3 when the leading shutter curtain 16 starts to run for exposure, and when the switch SW3 is opened an exposure amount control circuit to be explained later starts to count. A tail shutter curtain for stopping the exposure through the photographic lens 26, is urged along the direction of the arrow A by the spring 19. A tail curtain holding lever 13 engaging the tail shutter curtain 17 is rotatably supported on the shaft 14, and urged counterclockwise by the spring 15. The lever 13 rotates counterclockwise to disengage from the tail shutter curtain 17 when the current supply to an electromagnet Mg attracting the end 13a is interrupted. A push lever 10 to be rotated around the axis 12 with the dowel 5 on the release plate 1 as explained above, is urged counterclockwise by the spring 11 and pushes the end 13a of the tail curtain holding lever 13 against the magnet Mg with one end. A dowel 18a is provided on the leading shutter curtain.

A shutter running detection lever 20 rotates counterclockwise in response to the end which engages the tail shutter curtain 17 when the tail shutter curtain 17 has run and is rotatably supported on the axis 21 and urged clockwise by the spring 22. A switch change over member 23 is moved along the direction of the arrow C with an unshown spring when it is disengaged from the shutter running detection lever 20. Along with the movement of this switch changeover member 23 a switch SW4 to be explained later is switched over. Further, the switch change over member 23 is switched to assume the position in FIG. 1 when the camera has been charged or cocked after the switch SW4 has been switched over. A transmission lever 24 is rotatably supported on an axis 26 for moving a release lock member 27 along the guide pin so the end of the latter is positioned under the release plate 1 when the lever 24 is rotated against the force of the spring 25 by the switch changeover member 23. A spring 28 urges the release lock member 27 toward the left in the drawing.

Figure 2:
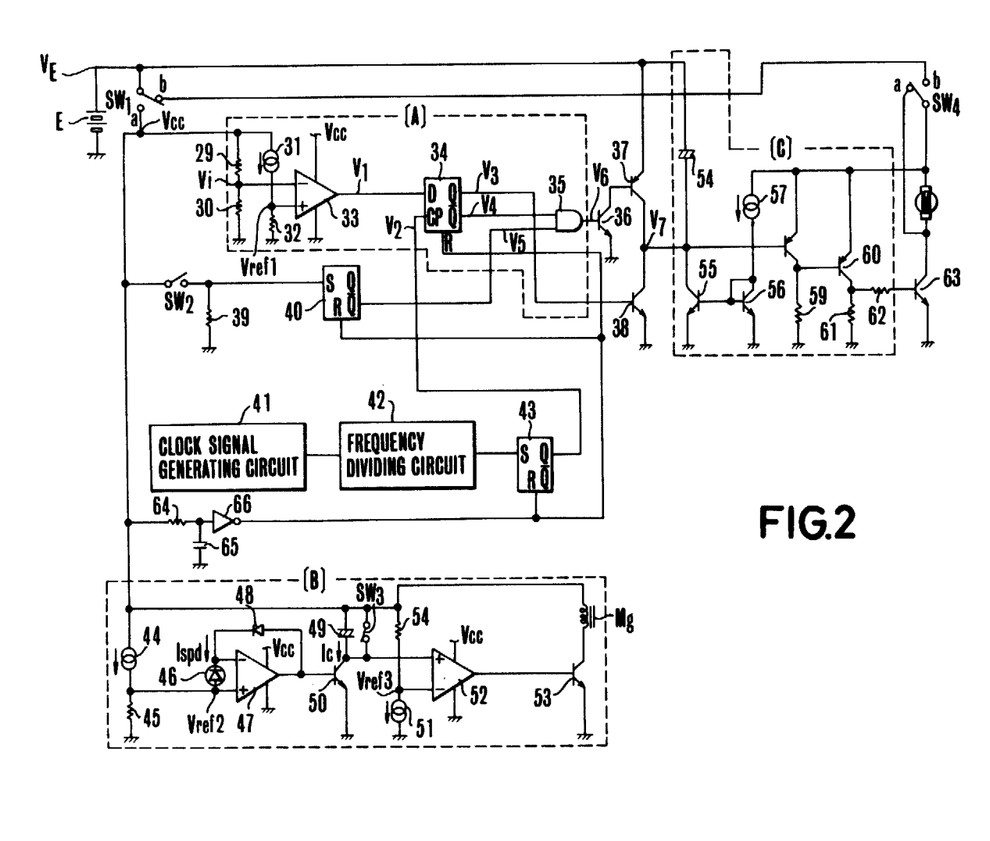
FIG. 2 shows an embodiment of the circuit of the photographic operation disabling device of the present invention.

FIG. 2 shows the circuit of the photographic operation prohibiting device of the camera of the present invention. The circuit includes a power source E, a switch SW1 to be changed over to the terminal a when the release plate 1 is moved along the direction of the arrow B, and voltage dividing resistors 29 and 30 for dividing the voltage Vcc of the power source battery E, so that potential Vi at the voltage dividing point is connected to an inverting input terminal (−) of a comparator 33. A constant current circuit 31 forms a standard potential Vref1 via a resistor 32. Thus, formed standard potential Vref1 is connected to the non-inverting input terminal (+) of the comparator 33. A D type flip-flop 34 (hereinafter called D-FF), has a D input which receives the output V1 of the aforementioned comparator 33 and is latched by the RS type flip-flop 43 (hereinafter called RS-FF) to be explained later in the D input state with the Q output V2. Further, the Q output V3 of the D-FF 34 is connected to the base of the NPN type switching transistor 38 forming the charging circuit of the condenser (i.e. capacitor) 54. A 2-input AND gate 35 receives the $\overline{Q}$ output V4 of the flip-flop D-FF and a $\overline{Q}$ output V5 of an RS type flip-flop 46 (hereinafter called RS-FF) is connected. The above members constitute the power source voltage detecting circuit A for detecting the voltage drop of the power source battery E. An NPN type transistor 36 whose base receives the output V6 of the AND gate 35 and a PNP type switching transistor 37 form a discharge circuit for the condenser 54, with the base of the transistor 37 being connected to the collector of the transistor 36.

A switch SW2 is to be closed once while the leading shutter curtain 16 in FIG. 1 is running and 39 a pull down resistance keeps the S input of the RS-FF 40 at low level when the switch SW2 is opened. A clock signal generating circuit 41 forms the basic count pulses, and starts to operate with the switching of the switch SW1 to the terminal a. A frequency dividing circuit 42 serves for dividing the frequency of the output of the back signal generating circuit 41. The output of 42 is connected to the S input of the flip-flop RS-FF43 so as to make the Q output V2 of the RS-FF43 high after the lapse of a predetermined time. A resistor 64 and a capacitor 65 form a CR time constant circuit. The output of the inverter 66 is kept high with the CR time constant during a predetermined time after the switch SW1 is set to the terminal a, in order to reset the flip-flop D-FF34, the flip-flop SR-FF40 and the flip-flop SR-FF43 with the pulse output.

An exposure amount control circuit B contains a MOSFET operational amplifier 47 as an input, an SPD (silicon photo diode) 46 connected between 2 inputs of the operational amplifier 47, a logarthimic compressing diode 48 connected as a negative feedback circuit, and a constant current circuit 44 and resistance 45 for applying a standard potential Vref2 as the bias voltage to the non-inverting input of the operational amplifier 47. A time constant condenser 49 is connected to the collector of an NPN prolongation transistor 50 and a count starting switch SW3 is connected in parallel with the condenser 49. The switch SW3 is opened when the exposure is started with the start of the leading shutter curtain as explained. A comparator 52 whose inverting input terminal (−) receives the standard potential Vref3 formed with the constant current circuit 51 and the resistance 54, has a non-inverting input terminal (+) connected to the collector of the transistor 50. The base of an NPN type switching transistor 53 is connected to the output of the comparator and the collector to the magnet Mg for controlling the start of the rear shutter curtain 17.

A motor driving circuit includes an NPN transistor 55, and a time constant condenser 54 for controlling the driving time of the motor M, the capacitor 54 being charged when the aforementioned transistor 55 is in the conductive state. An NPN type transistor 56 whose base is connected to the base of the transistor 55 forms a conventional current mirror circuit and to whose collector and base a constant current circuit 57 is connected. The collector current of the transistor 55 is equal to that of 56 due to the current mirror effect. A PNP type transistor 58 for prohibiting the driving of the motor M in accordance with the charge state of the condenser 54, has its base receive the potential V7 between the collector of the transistor 38 for charging the condenser 54 and that of the transistor 37 for discharging the condenser 54. The collector of the transistor 58 is grounded via a resistor 59 and also connected to the base of a PNP type transistor 60. An NPN type switching transistor 63 whose base is connected to the collector of the aforementioned transistor 60 via the resistance 62 and to whose collector the motor M is connected cause the latter to wind the film after the photographing and cock the leading and the tail shutter curtains. A resistance 61 is connected to the collector of the transistor 60.

A switch SW4 is to be changed over to the terminal b when the switch change over member 23 is moved along the direction of the arrow C in FIG. 1 after the tail shutter curtain 17 has run, and the terminal b is connected to that b of the switch SW1. Thus, the motor M is connected to the power source battery E when taking of the photograph is finished and the release plate 1 is no longer depressed. The switch SW4 is again changed over to the terminal a so as to interrupt the current supply to the motor M when the camera has been energized by the motor M and the switch changeover member 23 resumes the position in FIG. 1.

Below the operation of the above-mentioned embodiment of the present invention follows. Firstly, the case where the voltage of the power source battery E is higher than a certain value is explained in accordance with the waveforms in FIG. 3(a).

Figure 3A:
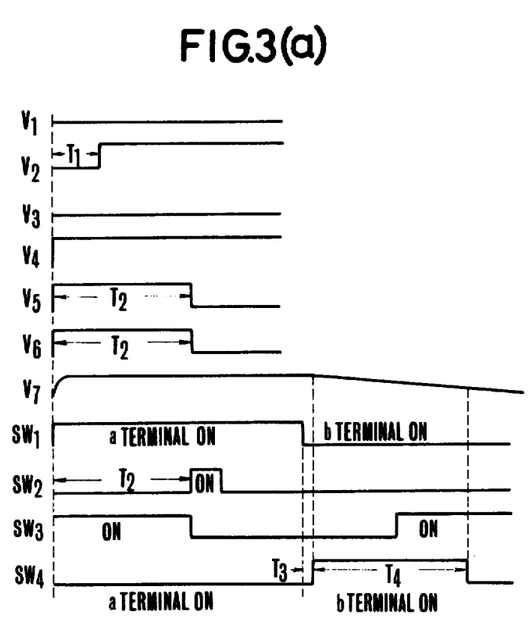
FIGS. 3(a) and 3(b) show wave forms for explaining the operation of the embodiment in FIG. 2.

When depression of the release plate 1 in FIG. 1 switches the switch SW1 to the terminal a, the level of the output of the inverter 66 goes low after being kept high for a predetermined time. Thus, the D-FF34, the RS-FF40 and the RS-FF43 are reset with this one pulse and the level of their Q outputs go low, while those of their $\overline{Q}$ outputs go high. With the change over of the switch SW1 the operational amplifier 47 of the exposure amount control circuit B produces an output in accordance with the incident light amount of the SPD 46. Thus, the collector of the transistor 50 carries a collector current Ic which flows via the switch SW3 and the level of the output of the comparator 52 becomes high so that the switching transistor 53 is brought in the switched-on state so as to start to supply current to the magnet Mg. With this current supply to the magnet Mg the tail shutter curtain holding lever 13 engaging the tail shutter curtain 17 maintains the state shown in FIG. 1, even if the release plate 1 is further depressed and the push lever 10 no longer depresses the end 13a, because the end 13a is attracted by the magnet Mg. Further, with the changeover of the switch SW1 at the terminal a the clock signal generating circuit 41 starts to operate so that the frequency dividing circuit 42 divides the frequency of the clock pulses from the clock signal generating circuit 41 in such a manner that after the lapse of a predetermined time (T1) after the changeover of the switch SW1 to the terminal a the level of the S input of the RS-FF43 [RS flip-flop 43] goes high. Thus, the level of the Q output V2 of the RS-FF43 becomes high. On the other hand, at this time the level of the output V1 of the comparator 33 is low if the divided voltage Vi connected to the inverting input terminal (−) of the comparator 33 is higher than the standard voltage Vref1 connected to the non-inverting input terminal (+). Thus, the D-FF34 [D flip-flop 34] assumes the D input state with the Q output V2 of the RS-FF43 and is latched so that the level of the Q output V3 is low, while that of the $\overline{Q}$ output V4 is high. Thus, at this time the transistor 38 is not switched on and the capacitor 54 is not charged. The level of the $\overline{Q}$ output V5 of the RS-FF40 is kept high after elapse of the time T2 from when the switch SW1 has been changed over by depression of the release plate 1 till the switch SW2 is once closed by running of the leading shutter curtain. Hence, the level of the output V6 of the AND gate 35 becomes high so as to turn on the transistor 37 forming the discharge circuit for the condenser 54 via the transistor 36. Thus, the level of the potential between the collector of the transistor 37 and that of 38 becomes high as is shown in FIG. 3(a).

When the depression of the release plate 1 disengages the leading shutter curtain 16 from the leading curtain holding lever 6 and the leading shutter curtain 16 starts to run, the exposure is started after the switch SW2 is once closed, while the switch SW3 is opened. Thus, the capacitor 49 starts to be charged with the collector current Ic flowing through the collector of the transistor 50 until the charge voltage becomes higher than the standard voltage Vref3, so the level of the output of the comparator 52 becomes low. The collector current Ic is controlled by the voltage produced with the operational amplifier 47 in accordance with the amount of light incident upon the SPD 46 so as to obtain a proper exposure. When the level of the output of the comparator 52 becomes low the switching transistor 53 is switched off so as to interrupt the current supply to the magnet Mg, which does not continue to attract the end of the rear shutter curtain holding lever 13 so as to disengage the rear curtain holding lever 13 from the rear shutter curtain 17, which starts to run to terminate the picture taking process.

In case the release plate 1 has resumed the position in FIG. 1 when the shutter running detecting lever 20 is rotated counterclockwise against the force of the spring 22 after the rear shutter curtain 17 has run, the switch changeover means 23 moves along the direction of the arrow. Thus, the switch changeover member 23 slides the release block member 28 via the transmission lever 24 until the end of the member 28 is positioned under the release plate 1. Depression of the release plate 1 is now prohibited. After the lapse of a small time T3 the switch SW4 is moved to the contact b. Because the switch SW1 is also placed at the contact b by the release of the release plate 1 the power source battery E is connected to the motor M.

At this time the capacitor 54 has been discharged and its terminal voltage is low. Thus, the level of the voltage V7 between the collector of the transistor 37 and that of 38 is high and the transistor 58 is switched off. Because the switch SW4 is set at the contact b the base-emitter of the transistor 60 is biased forward and the latter switched on, the switching transistor 63 is also switched on so as to start the current supply to the motor 63. The film winding, the shutter charge and so on is carried out with the motor M via a conventional charge mechanism for a predetermined time so that the camera is restored to the ready state shown in FIG. 1. At this time the switch changeover member 23 is operated and the switch SW4 is set to the terminal a so as to stop the motor. The way to throw a switch SW4 when the camera has been changed is known and makes use of the perforation of the film to be wound. When the switch SW4 is set to the terminal b, the transistors 55 and 56 forming a current mirror circuit are switched on and a current equal to the constant current flowing through the constant current circuit 57 flows through the collector of the transistor 55. Thus, the capacitor 54 is charged while a current is supplied to the motor M in such a manner that the voltage V7 is varied linearly as is shown in the drawing. When charging of the capacitor 54 drives the level of V7 low upon the lapse of predetermined time T(T>T4) after the current supply to the motor M, the transistor 58 is switched on such that the level of the base potential of the transistor 60 becomes high. Thus, the transistor 60 is switched off at this time so as to switch the transistor 63 off. Thus, in case the camera has not been charged and the switch SW4 is not switched to the terminal b even upon elapse of a predetermined time after the switch SW4 is set at the terminal b and a current starts to be supplied to the motor M, the current supply to the motor M is interrupted due to the terminal voltage of the charged capacitor 54. Hence, the motor is never supplied with current even when the film is terminated and the further winding is impossible. It goes without saying that the time since the capacitor 54 is charged till the transistor 58 is switched on is sufficiently longer than the time T4 necessary for charging the ordinary camera.

Figure 3B:
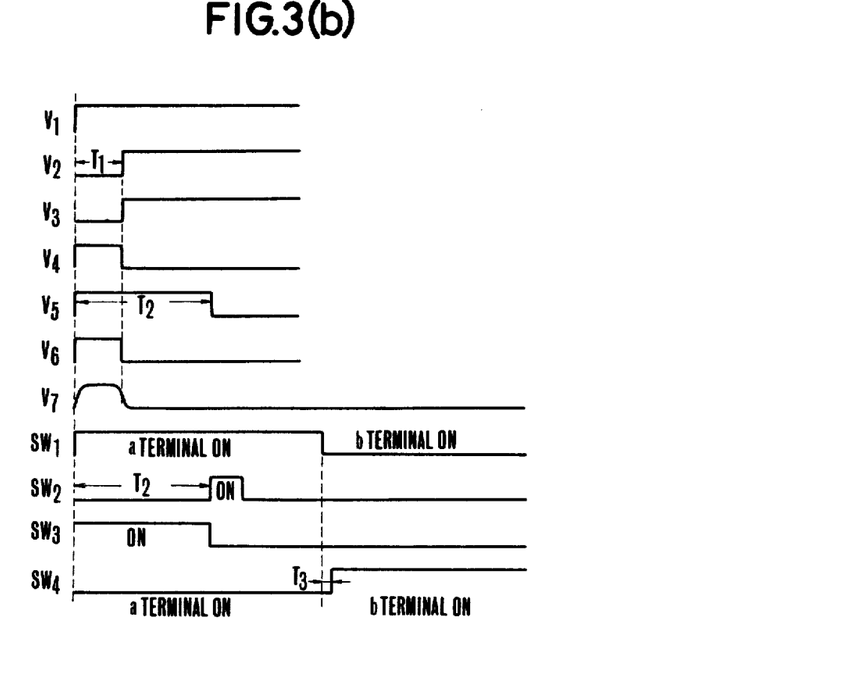

Operation when voltage of the power source battery E is lower than a predetermined value will be best appreciated from the waveforms shown in FIG. 3(b).

In this case the divided voltage Vi is lower than the standard voltage Vref1 so that the level of the comparator 33 is high. Thus, when the level of the Q output V2 of the RS-FF43 becomes high after the lapse of a certain time determined by the circuits 41 and 42 after the switch SW1 is set to the terminal a by the depression of the release plate 1, the output V3 of the Q output of the D-FF 33 becomes high, while the $\bar{Q}$ output V4 goes low so as to be latched. Thus, the output V6 of the AND gate 35 is kept low, and the transistor 37 is never switched on. On the other hand, the output V3 of the $\bar{Q}$ output of the D-FF34 is latched in the high level state, so that the transistor 38 is kept switched on and the capacitor 54 is charged such that its terminal voltage V7 becomes low as is shown in FIG. 3(b). After that the leading shutter curtain 16 starts to run so as to open the switch SW3 and control the exposure and when the rear shutter curtain 17 has run in the same way as in the aforementioned case the switch SW4 is set to the terminal b.

However, because in this case the voltage V7 is low in level so that the transistors 58 is switched on, the transistor 60 is not switched on and therefore the switching transistor 63 is also not switched on. Thus, even if a photograph is taken and the switch SW4 is changed over, no current is supplied to the motor M such that the camera is kept in the photograph finished state and the next photographing is prohibited. Further, in this case the release lock member 27 remains under the release plate 1, the release plate 1 cannot be depressed, something the photographer can easily recognize. Further, if the power source battery E is exchanged in this case, current starts to run to the motor M so that the camera can be charged so as to return the camera to the ready state shown in FIG. 1.

In accordance with the present invention, the motor M for charging the camera is not driven when the power source voltage is lower than a predetermined value so that without a complicated release mechanism it is possible to prohibit the photographic operation of the camera without fail when the voltage is low. Further, in accordance with the present invention a mechanical member for prohibiting the photographic operation when the voltage is low is not necessary at all. Hence, it is possible to achieve a compact and light camera and a shutter button with short release stroke, something which contributes greatly to the improvement in the operability of the camera.

By making use of the timer for controlling the operation time of the motor to disable the photographic operation it is not necessary to provide any special device in the motor driving circuit, which can thus be simplified.

In the present embodiment the Q output of the RS-FF40 for latching the switch on signal of the switch SW2 and the $\bar{Q}$ output of the D-FF34 are AND coupled so as to control the transistors 36 and 37. This is done to prevent the misoperation of the circuit itself with an unexpected signal due to the fact that the stop voltages in various means are different since the switch SW1 is opened at the terminal a till the switch SW4 is closed at the terminal b for the time T3 in FIG. 3, whereby the voltage V3 can be kept at the power source voltage without fail even after the switch SW1 is opened. In accordance with the present embodiment, if the power source voltage is low winding with the motor is prohibited so as to prevent picture taking. However, it is also possible to make use of the device proposed in U.S. application Ser. No. 321,208 filed Nov. 13, 1981 to prevent driving of the motor when an irregularity in the photographing operation is detected. In this way it is possible to enlarge the application of the photographic operation disabling device of the present invention.

The invention makes it possible to judge whether the conditions that enable the normal photographic operation in the next sequence control are satisfied or not when a sequence control during the photographic operation is passed to the next sequence control, in order to control the current supply to the circuit carrying out the next sequency control. This can clearly be applied to an automatic focusing camera, a flash light photographing camera and so on.

What is claimed is:

1. An electrically operated camera including:
   (a) a first operating circuit for carrying out a first photographic sequence of photographic sequences of the camera;
   (b) a second operating circuit for carrying out a second photographic sequence of the photographic sequences of the camera and following the first photographic sequence;
   (c) switching means for switching an electrical power source such that when the first photographic sequence of the camera is carried out by the first operating circuit, the second operating circuit is deprived of electrical power, and as the camera has transited from the first photographic sequence to the second photographic sequence and the photographic sequence of the camera is being carried out by the second operating circuit, the first operating circuit is deprived of electrical power;
   (d) discriminating means for determining whether or not the first photographic sequence by the first operating circuit is accomplished normally;
   (e) memory means for storing the output of said discriminating means; and
   (f) prohibiting means operative when said switching means as the first photographic sequence of the camera transits to the second photographic sequence of the camera, and responsive to the output of said memory means representing that the first photographic sequence of the camera has not been accomplished normally for preventing the second operating circuit from carrying out the second photographic sequence of the camera.

2. An electrically operated camera according to claim 1, wherein said prohibiting means includes means for stopping the second photographic sequence of the camera to prohibit the next exposure.

3. An electrically operated camera according to claim 1, wherein said discriminating means includes means for checking whether or not the electrical power source or battery is normal.

4. An electrically operated camera comprising:
   (a) a first operating circuit for operating an automatic exposure control of the camera;
   (b) a second operating circuit for operating an automatic film advance in sequence after the automatic exposure control of the camera;
   (c) switching means for connecting electrical power selectively to said first and said second operating circuits to that when the camera is operated by said first operating circuit, said second operating circuit is deprived of electrical power, and as the automatic exposure control has completed, when the automatic film advance is carried out, said first operating circuit is deprived of electrical power, and only the second operating circuit is supplied with electrical power;

(d) discriminating means for determining whether or not the automatic exposure control is carried out normally by said first operating circuit;

(e) memory means for memorizing the determination of said discriminating means; and (f) prohibiting means operative when said switching means deprives said first operating means of current and supplies said second operating means with current as the camera transits from the automatic exposure control to the automatic film advance and responsive to detection of the fact that the normal automatic exposure control of the camera sensed by said memory means has not been effected for preventing said second operating circuit from operating the automatic film advance.

5. An electrically operated camera comprising:
(a) a first operatied circuit for operating an automatic exposure control of the camera;
(b) a second operating circuit for operating an automatic film winding device in sequence after the automatic exposure control of the camera;
(c) switching means for connecting an electrical power source selectively to said first and said second operating circuits so that when the camera is operated by said first operating circuit, said second operating circuit is not supplied with electrical power, and as the automatic exposure control has completed, when automatic film winding device is to be operated, said first operating circuit is not supplied with electrical power, but only the second operating circuit is supplied with electrical power;
(d) discriminating means for determining whether or not the voltage of said electrical power source is normal during the time the automatic exposure control of the camera is being operated by said first operating circuit;
(e) memory means for memorizing the determination of said discriminating means;
(f) prohibiting means operating after the switching means starts supplying current to said second operating circuit and stops supplying current to said first operating circuit as the camera transits from the automatic exposure control to the automatic film winding and responsive to detection of the fact that said electrical power source did not have the normal voltage memorized by said memory means during the automatic exposure control for prohibiting said second operating circuit from the carrying out an automatic film winding operation.

6. An electrically operated camera according to claim 5, wherein said prohibiting means includes means for stopping the operation of said second operating circuit so that the next exposure is prevented from proceeding.

7. An electrically operated camera according to claim 5, wherein said second operating circuit comprises a CR time constant circuit for determining the automatic film winding time, and said memory means includes a capacitor forming a part of said CR timing constant circuit.

8. An electrically operated camera including:
(a) a first operating circuit for carrying out a first photographic sequence of photographic sequences of said camera;
(b) a second operating circuit for carrying out a second photographic sequence of the photographic sequences of said camera in sequences to said first photographic sequence;
(c) discriminating means for determining whether or not said first photographic sequence is normally effected by said first operating circuit;
(d) a capacitor for electrically memorizing the determination of said discriminating means; and
(e) prohibiting means operative when said camera transits from said first to said second photographic sequence, and response to the capacitor memorizing detection of the fact that the normal first photographic sequence of said camera has not been effected for prohibiting said second operating circuit from carrying out said second photographic sequence.

9. An electrically operated camera including:
(a) a first operating circuit for operating an automatic exposure control of said camera;
(b) a second operating circuit for operating an automatic film advance in sequence after the automatic exposure control of said camera;
(c) discriminating means for determining whether or not the normal automatic exposure control is effected by said first operating circuit;
(d) a capacitor for electrically memorizing the determination of said discriminating means; and
(f) prohibiting means operative when said camera transits from the automatic exposure control to the automatic film advance and responsive to the capacitor memorizing detection of the fact that normal automatic exposure control of said camera has not been effected for rendering said second operating circuit inoperative.

10. An electrically operated camera including:
(a) a first operating circuit for carrying out a first photographic sequence of a plurality of photographic sequences of said camera;
(b) a second operating circuit for carrying out a second photographic sequence of the plurality of photographic sequences of said camera after the first photographic sequence;
(c) switching means for connected an electrical power source selectively to said first and said second operating circuits so that as said camera has transited from said first to said second photographic sequence, when the photographic sequence of said camera is carried out by said second operating circuit, said first operating circuit is not supplied with electrical power;
(d) discriminating means for determining whether or not said first photographic sequence is effected normally by said first operating circuit;
(e) memory means for memorizing the determination of said discriminating means; and
(f) prohibiting means operative when said switching means is changed over so that said camera transits from said first to said second photographic sequence and responsive to memorizing by the memory means of detection of the fact that the first photographic sequence of said camera has not been effected normally for prohibiting said second operating circuit from carrying out said second photographic sequence of said camera.

11. An electrically operated camera including:
(a) a first operated circuit for carrying out a first photographic sequence of photographic sequences of said camera;
(b) a second operating circuit for carrying out a second photographic sequences of the photographic sequences of said camera in sequence to said first photographic sequence;

(c) switching means for connecting an electrical power source selectively to said first and said second operating circuits so that when the photographic sequences of said camera is carried out by said first operating circuit, said second operating circuit is not supplied with electrical power, and as said camera has transited from said first to said second photographic sequence when the photographic sequence of said camera is carried out by said second operating circuit, said first operating circuit is not supplied with electrical power;

(d) discriminating means for determining whether or not said first photographic sequence is normally effected by said first operating circuit; and (e) prohibiting means operative when said switching means is changed over so that said camera transits from first to said second photographic sequence and responsive to that of the outputs of said discriminating means which represents the fact that the first photographic sequence of said camera has not been effected for prohibiting said second operating circuit from carrying out said second photographic sequence of said camera.

* * * * *